(12) United States Patent
Hamper

(10) Patent No.: US 8,478,614 B2
(45) Date of Patent: Jul. 2, 2013

(54) SYSTEM AND METHOD FOR ENSURING ACCURATE REIMBURSEMENT FOR TRAVEL EXPENSES

(75) Inventor: Lynn C. Hamper, St. Louis, MO (US)

(73) Assignee: Biz Travel Solutions, LLC, St. Louis, MO (US)

( * ) Notice: Subject to any disclaimer, the term of this patent is extended or adjusted under 35 U.S.C. 154(b) by 860 days.

(21) Appl. No.: 12/433,371

(22) Filed: Apr. 30, 2009

(65) Prior Publication Data

US 2009/0271302 A1 Oct. 29, 2009

Related U.S. Application Data

(63) Continuation-in-part of application No. 12/133,863, filed on Jun. 5, 2008, now abandoned, which is a continuation-in-part of application No. 11/419,643, filed on May 22, 2006, now abandoned.

(60) Provisional application No. 61/165,037, filed on Mar. 31, 2009, provisional application No. 60/682,995, filed on May 20, 2005.

(51) Int. Cl.
*G06Q 10/00* (2012.01)
(52) U.S. Cl.
USPC .................................. 705/5; 705/1.1
(58) Field of Classification Search
USPC .................................. 705/5, 1.1, 30
See application file for complete search history.

(56) References Cited

U.S. PATENT DOCUMENTS

| | | | | |
|---|---|---|---|---|
| 5,754,857 A * | 5/1998 | Gadol | ........................... | 709/203 |
| 6,029,144 A * | 2/2000 | Barrett et al. | ................... | 705/30 |
| 6,442,526 B1 * | 8/2002 | Vance et al. | ...................... | 705/5 |
| 7,209,886 B2 * | 4/2007 | Kimmel | ........................... | 705/3 |
| 7,536,349 B1 * | 5/2009 | Mik et al. | ........................ | 705/39 |
| 7,693,787 B2 * | 4/2010 | Provinse | ........................ | 705/39 |
| 7,720,702 B2 * | 5/2010 | Fredericks et al. | ............... | 705/6 |
| 7,778,850 B2 * | 8/2010 | Wester | ............... | 705/3 |
| 2002/0026416 A1 * | 2/2002 | Provinse | ........................ | 705/39 |
| 2002/0152101 A1 * | 10/2002 | Lawson et al. | .................... | 705/6 |
| 2003/0088487 A1 * | 5/2003 | Cheng et al. | .................... | 705/30 |
| 2003/0120526 A1 * | 6/2003 | Altman et al. | .................... | 705/5 |
| 2004/0002876 A1 | 1/2004 | Sommers et al. | | |
| 2004/0167808 A1 | 8/2004 | Fredericks et al. | | |
| 2005/0015272 A1 | 1/2005 | Wind et al. | | |
| 2005/0222854 A1 * | 10/2005 | Dale et al. | ........................ | 705/1 |
| 2006/0212321 A1 * | 9/2006 | Vance et al. | ...................... | 705/5 |
| 2010/0257003 A1 * | 10/2010 | Fredericks et al. | ............... | 705/6 |

* cited by examiner

*Primary Examiner* — Shannon Campbell
(74) *Attorney, Agent, or Firm* — Saul Ewing LLP

(57) ABSTRACT

An Expense Verification System (EVS) checks for fraud and errors in reimbursement requests. The EVS stores requests including reference numbers, and receives travel reservation records from a payment clearinghouse system. Each record includes a reference number and associated reservation data. The EVS selectively denies stored reimbursement requests as a function of data contained in the travel reservation record. Alternatively, the EVS selectively issues an alert as a function of data contained in the travel reservation record. Further, the EVS may parse a received reimbursement request to identify a respective reference number, compare the parsed reference number to the stored reimbursement requests to determine whether the parsed reference number matches a stored reference number, and deny the received reimbursement request if the parsed reference number matches a stored reference number. The EVS may store the received reimbursement request if the parsed reference number does not match a stored reference number.

14 Claims, 10 Drawing Sheets

SYSTEM AND METHOD FOR ENSURING ACCURATE REIMBURSEMENT FOR TRAVEL EXPENSES

CROSS-REFERENCE TO RELATED APPLICATIONS

This application claims the benefit of priority under 35 U.S.C. §119(e) of U.S. Provisional Patent Application No. 61/165,037, filed Mar. 31, 2009, and is a continuation-in-part of U.S. patent application Ser. No. 12/133,863, filed Jun. 5, 2008, which is a continuation-in-part of U.S. patent application Ser. No. 11/419,643, filed May 22, 2006, which claims the benefit of priority under 35 U.S.C. §119(e) of U.S. Provisional Patent Application No. 60/682,995, filed May 20, 2005, the entire disclosures of all of which are hereby incorporated herein by reference.

FIELD OF THE INVENTION

The present invention relates generally to computing systems for ensuring accurate reimbursement for travel expenses.

Discussion of Related Art

Reimbursement of travel expenses is a costly expense for corporations, employers, and other entities (collectively referred to broadly herein as a "company"). Unfortunately, both innocent errors and fraud are difficult to detect, particularly when a large number of travelers, etc. are involved. Inaccurate reimbursements can be a significant drain on a company's coffers.

Changes in the airline industry have increased the opportunities for inaccurate reimbursement requests. For example, airline travel reservations (e.g., for airline travel tickets) may be made by corporate personnel, third party travel agencies, or by the employee him- or herself. Further, such reservations may be made directly through an airline, by telephone or its website, or through a travel aggregation website, such as Travelocity, Expedia, Orbitz, etc. Further complicating the issues are the optional and/or inconsistent use of personal and/or company credit cards or other payment accounts, and the need for compliance with company policies, which vary from company to company and may vary with a single company over time. Further still, airline reservations may be left unused, or may be exchanged, with or without associated fees. These factors place a particularly heavy burden on an employee, etc. to accurately report expenses to his/her employer, etc., and present ample opportunities for an ill-intentioned person to obtain unauthorized or excessive travel reimbursement, resulting in a loss to the company.

What is needed is a system for ensuring accurate reimbursement of travel expenses.

SUMMARY OF THE INVENTION

The present invention provides methods for ensuring accurate reimbursement for travel expenses. An exemplary computer-implemented method involves storing reimbursement requests for travel reservations, each reimbursement request comprising a respective reference number, receiving travel reservation record transmitted from a payment clearinghouse system, the record comprising a reference number and associated reservation data; and selectively denying at least one stored reimbursement request as a function of data contained in the travel reservation record. For example, a stored reimbursement request identifiable by a certain reference number is denied if received travel reservation record data associated with the same reference number includes a CANCELED, EXCHANGED or REFUNDED status identifier.

Another exemplary computer-implemented method involves storing reimbursement requests for travel reservations, each reimbursement request comprising a respective reference number, receiving a travel reservation record transmitted from a payment clearinghouse system, the record comprising a reference number and associated reservation data; and issuing an alert as a function of data contained in the travel reservation record. For example, if received reservation record data is associated with a USED status identifier and a reference number that does not match a stored reference number of a stored reimbursement request, then this indicates that a corresponding expense report has not been submitted, and may indicate non-business use of a company-purchased ticket. Accordingly, an exception alert may be issued to trigger corrective action, which may include investigation of the matter, a request for a refund, a deduction from a paycheck, or other request for reimbursement.

Another exemplary computer-implemented method involves storing reimbursement requests for travel reservations, each reimbursement request comprising a respective reference number, receiving a reimbursement request including a respective reference number, parsing the received reimbursement request to identify the respective reference number; comparing the parsed reference number to the stored reimbursement requests to determine whether the parsed reference number matches a stored reference number; storing the received reimbursement request in the memory if the parsed reference number does not match a stored reference number; denying the received reimbursement request if the parsed reference number does match a stored reference number; and issuing a denial alert if at least one reimbursement request is denied.

Systems and computer program products for carrying out the inventive methods are provided also.

BRIEF DESCRIPTION OF THE DRAWINGS

The present invention will now be described by way of example with reference to the following drawings in which.

DETAILED DESCRIPTION

A system and method are provided for ensuring accurate reimbursement by a company for travel expenses submitted for reimbursement by a traveler. Further, the system and method are provided for detecting fraud, errors and/or non-compliance with applicable reimbursement policies. Accordingly, the system is capable of ensuring accurate reimbursement by employers for travel expenses captured by employee expense reports, such as for travel expenses commonly incurred in connection with routine business activities.

Figure 1:
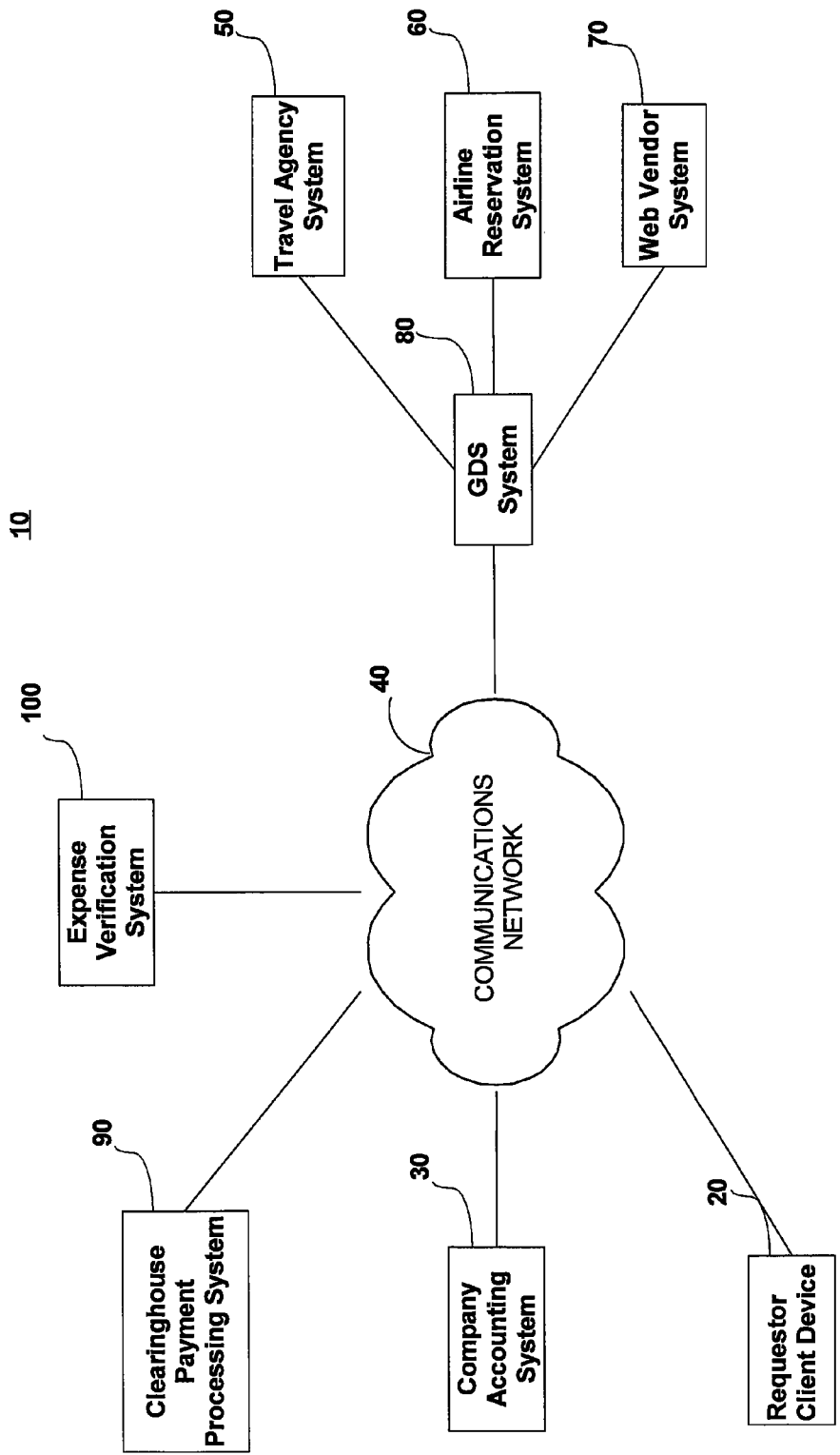
FIG. 1 is a block diagram showing an exemplary networked computing environment in which a system and method in accordance with the present invention may be practiced.

The present invention may be understood with reference to the exemplary simplified network environment 10 of FIG. 1. As shown in FIG. 1, the exemplary networked environment 10 includes an Expense Verification System (EVS) 100 in accordance with the present invention. The EVS includes conventional computing hardware but is specially-configured with special-purpose software in accordance with the present invention to provide a particular special-purpose machine configured to carry out the inventive methods described herein, as discussed in further detail with reference to FIG. 10.

As is conventional, the network environment 10 further includes a traveler/employee client device, such as a web-browsing enabled personal computer connected via a communications network 40, such as the Internet, that is capable of computing with an enterprise accounting system, such as company accounting system 30. By way of example, company accounting system 30 may include a web server providing a website-based interface to client device 20 by which a traveler/employee may provide travel expense reimbursement requests, receipts and other supporting documentation, images, etc. via a website interface. The accounting system 30 may include expense reimbursement management software, such as the Concur travel and expense management software manufactured and/or distributed by Concur Technologies, Inc. of Redmond, Wash., USA, as is known in the art. Such systems are well-known in the art and beyond the scope of the present invention, and thus will not be discussed in greater detail here.

As discussed briefly above, the traveler may make airline travel reservations, e.g. purchase airline travel tickets, via a travel agency, via the airline itself, or via a web aggregator that aggregates offerings from multiple airlines/vendors. As shown in FIG. 1, each such entity may have its own computerized system 50, 60, 70 configured for communicating via the network 40. Generally, each such systems 50, 60, 70 may include a web server for communicating with the traveler's client device 20 via the network 40 to present a suitable website interface for display travel options, receiving user selections, and receiving credit card or other payment information. Such systems are well-known in the art and beyond the scope of the present invention, and thus are not discussed in detail herein.

In this example, each such system 50, 60, 70 communicates with a global distribution system (GDS) 80 that receives data feeds from various airlines' systems, and may also receive information from computer systems of other entities providing travel-related services, such as hotels, rental cars, and ferry and rail transportation providers. The GDS' primary function is to communicate airline, flight, rental car, hotel, etc. information to travel agencies, corporate travel departments, etc. By way of example, the GDS may transmit and receive data streams to communicate with the travel agency system 50, airline reservation system 60 and web vendor system 70, e.g. to receiving booking information from the airline reservation system 60 and to transmit such information to the travel agency system 50, or vice versa. Such GDS systems and receipt and processing of such data streams are well-known in the art and beyond the scope of the present invention, and thus are not discussed in detail herein. Examples of such systems include the Amadeus system maintained by Amadeus North America, Inc. of Miami, Fla., USA, the Galileo and Worldspan systems maintained by Travelport GDS of Atlanta, Ga., USA, and the Sabre system maintained by Sabre Travel Network of Southlake, Tex., USA.

As known in the art, the GDS systems are in communication with multiple airline systems, hotel systems, travel agent systems, online booking agent systems, etc., and may be used by the individual or a travel agent to make airline, hotel, automobile, etc. reservations. Such systems, and technology for obtaining reservation information from such systems, are well-known in the art for use by travel agencies, etc. for use to "book" airline travel reservations, modify travel reservations, cancel travel reservations, etc. By way of example, the GDS may transmit, receive and/or store an information record for each purchased reservation. By way of example, in the context of airline travel reservations, an exemplary record may include information identifying a ticket or other reference number, a traveler's name, an associated airline carrier, etc.

Of particular note in FIG. 1 is the existence of the clearinghouse payment processing system 90, which is a computer systems operatively connected to the network 40 for communication with the travel agency system 50, airline reservation system 60, and web vendor system 70. By way of example, the Airline Clearinghouse (ACH) and International Airline Transit Association Clearinghouse (ICH) are examples of such payment clearinghouses having such clearinghouse payment processing systems. Information relating to such clearinghouses can be found at www.achpublic.airlines.org/Pages/Home.aspx and www.iata.org. As known in the art, such clearinghouse payment processing systems 90 receive and/or transmit datastreams containing airline travel reservation records to and/or from third parties, such as the travel agency system 50, airline reservation system 60, and web vendor system 70 to exchange data therewith, as discussed below. Preferably each travel reservation record includes at least a reference number, a status identifier, a payment amount, a payment account identifier and a payment transaction date, although each record may not include all of these fields. Such clearinghouse payment processing systems 90 are well-known in the art and beyond the scope of the present invention, and thus are not discussed in detail herein. As known in the art, together such clearinghouses process payments for virtually all commercial airlines flying within or to/from the United States, and in most other parts of the world.

Payments, credits and other transactions for airline travel reservations made, canceled and/or modified via the GDS or other systems are processed via the centralized payment processing clearinghouse system(s) 90. Such clearinghouse systems, and technology for processing payment and/or reservation information, are well-known in the art. By way of example, the clearinghouse systems may transmit, receive and/or store a travel reservation record for each transaction relating to an airline/travel reservation. By way of example, an exemplary record may include information identifying a ticket number, a traveler's name, an associated airline carrier, and credit card or other account (payment) information. Conventionally, such information is routed through the clearinghouse to and from the relevant airlines' systems, and to and from credit card or other payment processing systems. Further, as known in the art, each clearinghouse system 90 tracks the status of each airline reservation (e.g., used, exchanged, refunded, open/unused, canceled, etc.) and transmits such ticket status data as part of each record in the data it transmits to third parties. Traditionally, such status data has been transmitted and used solely for the purpose of notifying travel agencies of the status of travel arrangements, e.g. to respond to inquiries from passengers, travel agencies, credit card companies, etc.

The EVS 100 may be provided as conventional, commercially-available computing hardware and software configured with special-purpose software for configuring the hardware as a particular specially-configured machine for carrying out unique algorithms and/or methodology in accordance with the present invention, and described below. The EVS 100 is in electronic communication with a conventional airline payment clearing house system, such as the ACH or ICH clearinghouse payment processing system 90, and/or a global distribution system (GDS) system 80. The remaining systems shown in FIG. 1 may include conventional computerized hardware and software for browsing the web, such as a suitably configured, e.g. as web or back-end, servers, or as personal or other computers. The client device 20 includes conventional computer hardware and software for browsing the web.

Thus, each payment clearinghouse system 90 provides a data feed in a manner similar to those traditionally provided to vendors', airlines' and/or other entities' systems for various purposes unrelated to those described herein. Any changes in status, etc. relating to a particular ticket are changes automatically tracked and reflected in clearinghouse transaction data associated with the same ticket/reference number, as known in the art.

In accordance with the present invention, the EVS 100 is configured to obtain data from the payment clearinghouse systems' datastreams and to track reservations, by reference number over time. Accordingly, both initial reservation information and subsequent changes to the reservation as communicated to the EVS 100. In accordance with the present invention, transaction data obtained from the payment clearinghouse is checked against employee-submitted requests for reimbursement, and requests are rejected when there are inconsistencies with the clearinghouse transaction data, which is taken to be more reliable than traveler-submitted expense data. Further, information parsed from the clearinghouse transaction data is used to check for compliance with pre-stored rules, and to enforce compliance with applicable corporate policies, e.g., by rejecting a request for reimbursement for a reservation that is not in compliance with corporate policy or by issuing an alert flagging an information record for review or other processing. Thus, data available from payment clearinghouses for other purposes is used as described herein for ensuring accurate reimbursement of travel expenses, compliance with company policies, etc.

More specifically, data received from conventional payment clearinghouse systems 90 is supplied as input to the inventive EVS 100 for the purpose of detecting errors and attempted fraud in obtaining employee reimbursement for corporate travel arrangements, and/or for otherwise ensuring accurate expense reimbursement, policy compliance, etc. For example, the EVS 100 may be in communication with a corporate computing/accounting/expense management system for processing expense reports and/or approving requests for reimbursement of expenses, such that approval must first be obtained by the EVS 100 before reimbursement can be authorized. Accordingly, for example, rather than rely solely upon employee-submitted expense reports in support of requests to reimburse the employee, the EVS 100 obtains information from an independent, third party's computing system (namely the clearinghouse payment processing system 90), and compares employee-submitted data with the clearinghouse's third party-supplied data for verification and/or supplementation purposes. Such data may be directed from the clearinghouses' systems to the EVS 100 via a data feed in a manner similar to the manner in which similar data feeds are provided by the clearinghouses to the airline and/or credit card payment systems.

It should be noted that each corporate entity or other entity may be configured to receive from the clearinghouse only information relating to travel arrangements made by, for, or on an account associated with that entity. Alternatively, a single, centralized EVS may receive from a clearinghouse records for multiple entities, but will consider only those records associated with a certain entity when performing the methods herein. It should be further noted that the information received from the clearinghouse and used for the purposes described herein may be received at the EVS directly from the clearinghouse system, or may be received indirectly, e.g., via an intermediate such as the entity's systems, or another third party's computer system, such as a credit card company's system. Further, it will be appreciated that some or all of the functionality described with respect to each method may be distributed across what might otherwise be perceived as discrete or distinct computer systems. Accordingly, the descriptions in the exemplary embodiments described herein should be viewed as exemplary and illustrative, but not limiting.

In one embodiment, the EVS 100 is configured to operate as a web server to provide a website interface for the various purposes described herein. In one aspect, the website provides an Expense Report interface providing text entry fields by which expense data may be compiled and submitted to the EVS 100 as an expense report requesting reimbursement. This interface may be used, for example, by an employee, to input his/her own expenses to the EVS 100 using a client computing device. The EVS 100 is further configured to provide an Expense Approval interface, which may be used, for example, by Accounts Payable personnel of the employee's employer to view data via a client computing device. The EVS 100 is further configured to provide expense processing, and to approve reimbursement of a particular expense only after one or more predetermined verification methods (described below) have been completed successfully. Approval for reimbursement may be issued by the EVS 100 in any suitable form, including by display of an approval message via the Approval interface. Pertinent information is stored in a data store.

In an alternative embodiment, the EVS is configured to receive employee-submitted expense data as data transmitted from an enterprise's separate travel and expense management software, such as the Concur travel and expense software referenced above, which receives and stores in a data store employee-supplied expense report data in a conventional manner.

An expense report submitted to the EVS 100 by an employee/traveler is effectively a request by the employee for the company to reimburse the employee for the submitted expense. The EVS 100 requires an associated reference number for an expense report to be complete, and to be accepted by the system. The reference number is a number that uniquely identifies the associated transaction, and such a reference number is already routinely provided and tracked in clearinghouse information records. By way of example, the reference number may be a ticket number for airline tickets.

An exemplary system for carrying out the methodology described herein includes a memory and a processor, and stores in its memory computer readable instructions executable by the processor to carry out the verification methods described herein, as discussed in greater detail with reference to FIG. 10. Exemplary verification methods are described below.

Avoiding Reimbursement for Duplicate Passenger Receipts

Figure 2:
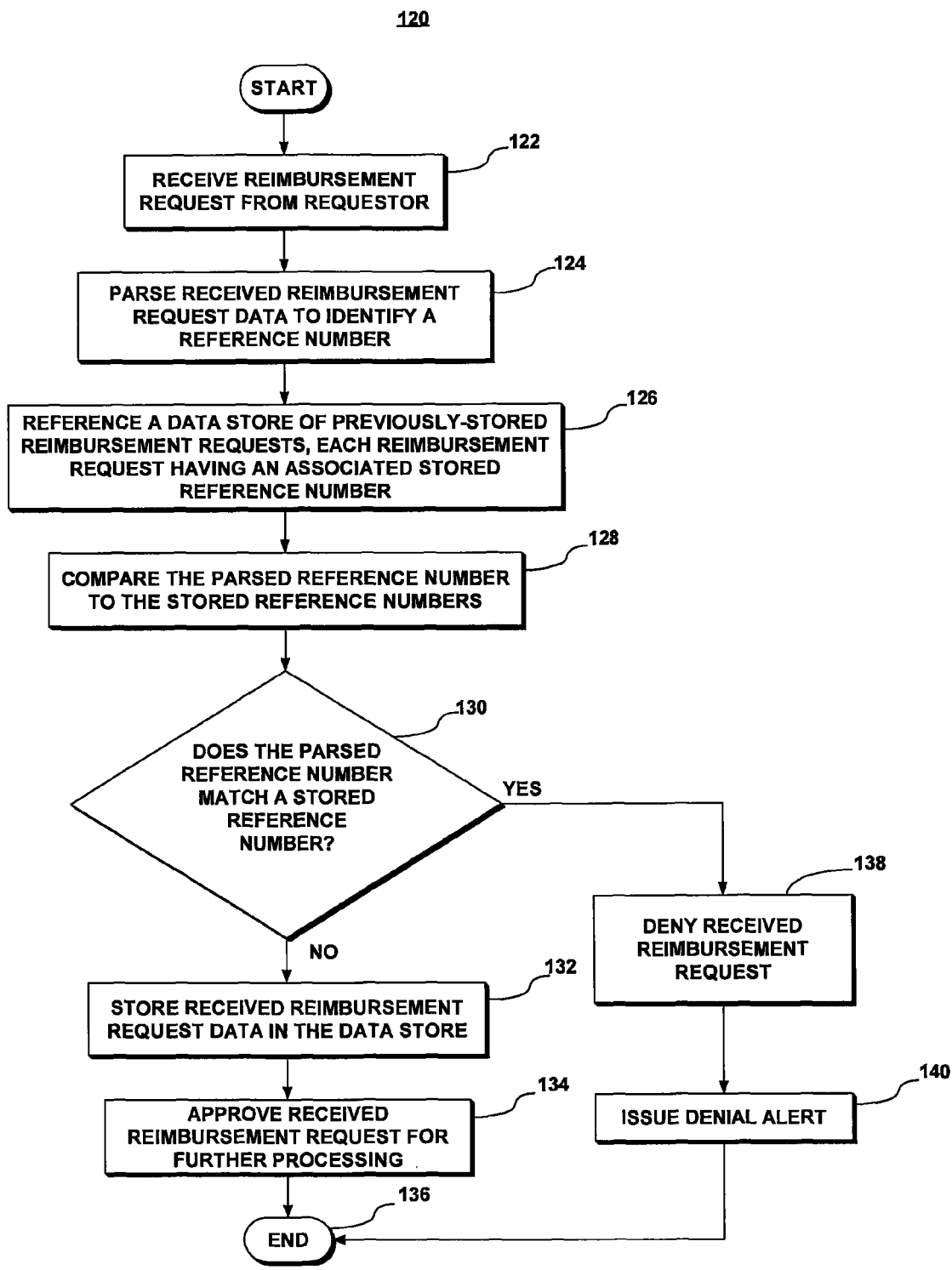
FIG. 2 is a flow diagram illustrating an exemplary method for ensuring accurate reimbursement for duplicate passenger receipts, in accordance with the present invention.

Referring now to FIG. 2, a flow diagram 120 is shown that illustrates an exemplary method for ensuring accurate reimbursement for duplicate passenger receipts. A passenger (often referred to herein in an exemplary, non-limiting manner as an "employee" or a "traveler") may obtain duplicative receipts for a single airline travel reservation, e.g., one from a travel agency and/or online booking service and another from the airline. This creates an opportunity for the traveler to submit a separate reimbursement request for each receipt, and to be improperly reimbursed twice for a single expense.

To avoid reimbursement by a company, etc. (referred to herein for illustrative purposes, and in a non-limiting manner as "company") for each of duplicate passenger receipts, or non-compliant receipts, the EVS 100 is configured to carry out the method illustrated in FIG. 2 to deny reimbursement requests where appropriate, and thus to avoid excessive reimbursement by the company, and a resultant loss.

Referring now to FIG. 2, the method begins with the EVS's 100 receipt of reimbursement request data from the employee, etc. requesting reimbursement (referred to herein as the "requester"), as shown at 122. By way of example, this information may be submitted by the requestor to the company in paper form, and may be inputted into the company's accounting system 30 (FIG. 1) by appropriate company personnel. Such information may then be transmitted in the form of electronic data to the EVS 100, via the network 40. By way of example, such information may be provided an input to expense management software running at the company's accounting system 30, and may be provided to the EVS 100 as exported or transmitted data from the expense management software. One commercially-available example of such expense management software is the Concur travel and expense software referenced above. Any suitable software may be used at the accounting system 30 for this purpose.

Alternatively, the accounting system 30 may receive such input as input provided electronically by the requestor, e.g. via a website interface, using the requestor's client computing device 20, as shown in FIG. 1.

Referring again to FIG. 2, the EVS 100, under control of its processor executing microprocessor-executable instructions for carrying out the method steps described herein, then parses the received reimbursement request data to identify a reference number, as shown at 124. As described above, the reference number may be an airline ticket or reservation number. Alternatively, in this example, the reference number may be a reservation, confirmation or other reference number for hotel, rental car, or any other reservation. This information is collected from receipts and/or other information provided by the requester.

Figure 10:
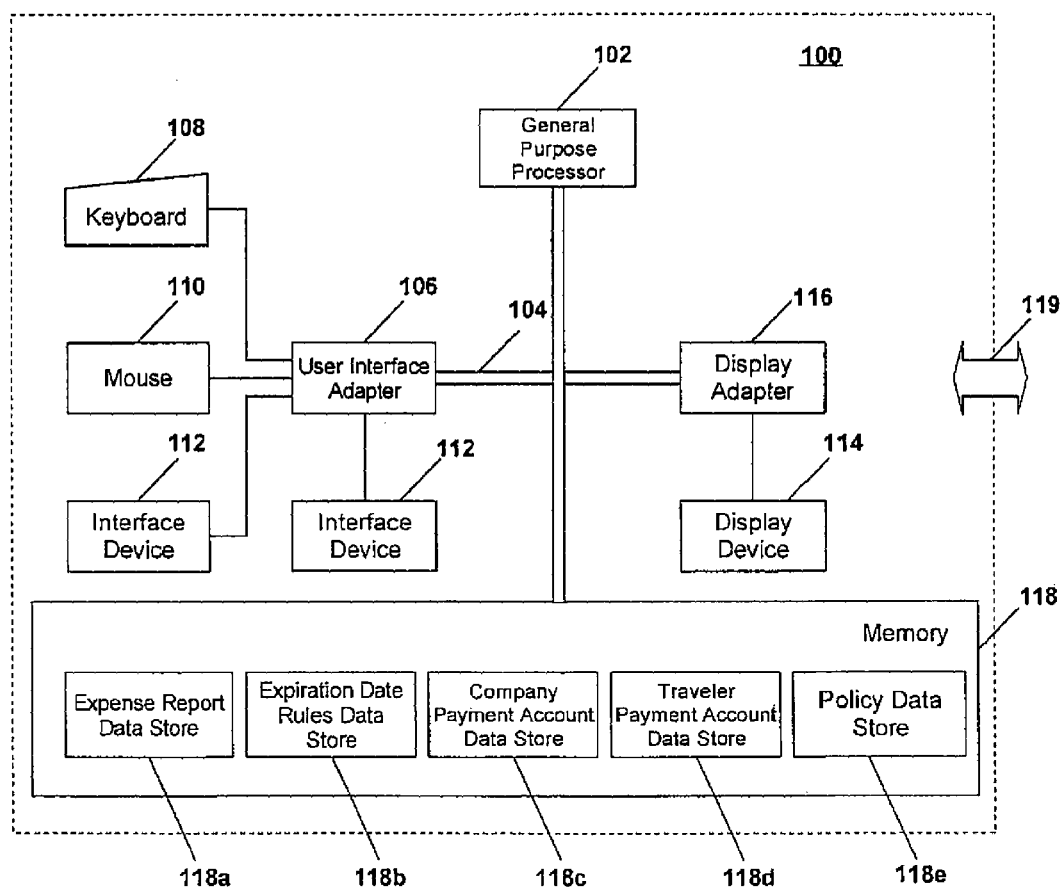
FIG. 10 is a block diagram showing diagrammatically a system in accordance with the present invention.

Expense report information received by the EVS 100 is stored in its memory 118 in an expense report data store 118a, as shown in FIG. 10. Accordingly, this data store grows as additional expense reports are received. The EVS then references the expense report data store 118a of previously-stored reimbursement requests, as shown at 126 of FIG. 2. Each stored reimbursement request record in the data store includes at least a stored reference number, e.g. a respective airline ticket/reservation number. The EVS 100 further compares the parsed reference number to the previously received and stored reference numbers stored in the data store 118a, as shown at 128, and determines whether the parsed reference number matches any stored reference number, as shown at 130.

If it is determined at 130 that the parsed reference number does not match any stored reference number, then the received reimbursement request data is stored in the data store 118a as an additional, seemingly valid, request for reimbursement, as shown at step 132. Accordingly, the request for reimbursement is seemingly valid, and is conditionally approved for reimbursement, subject to further processing and further analysis in accordance with the methods described herein, as shown at 134. This method then ends, as shown at 136.

If, however, it is determined at 130 that the parsed reference number does match a stored reference number, this indicates that request for a single travel expense is being requested more than once. To avoid duplicative reimbursement, then, the EVS 100 then denies the received reimbursement request and issues a denial alert, and this exemplary method ends, as shown at 138, 140 and 136. The denial report may have any suitable form, including a display on a display device of the EVS 100, generation of a suitable printed report identifying the details and denial of the reimbursement request, issuance of any other suitable alert signal and/or transmission or related data. The precise form of the alert is not critical to the method.

It should be noted that this method may be used to ensure compliance with corporate policies. For example, a corporate policy may require pre-approval for amounts of $600 and above, but permit automatic payment without approval for amounts less than $600. In view of this policy, an employee may obtain multiple partial receipts for a single reservation, e.g. a cash receipt for $450 and a credit card receipt of $550 to pay for a single reservation (having a single ticket number) costing $1,000, to give the appearance of complying with company policy to obtain payment without pre-approval of the expense. This method may be used to detect multiple receipts submitted for a single reference number in an attempt to circumvent corporate policies.

Avoiding Reimbursement for Canceled and Exchanged Reservations

Figure 3:
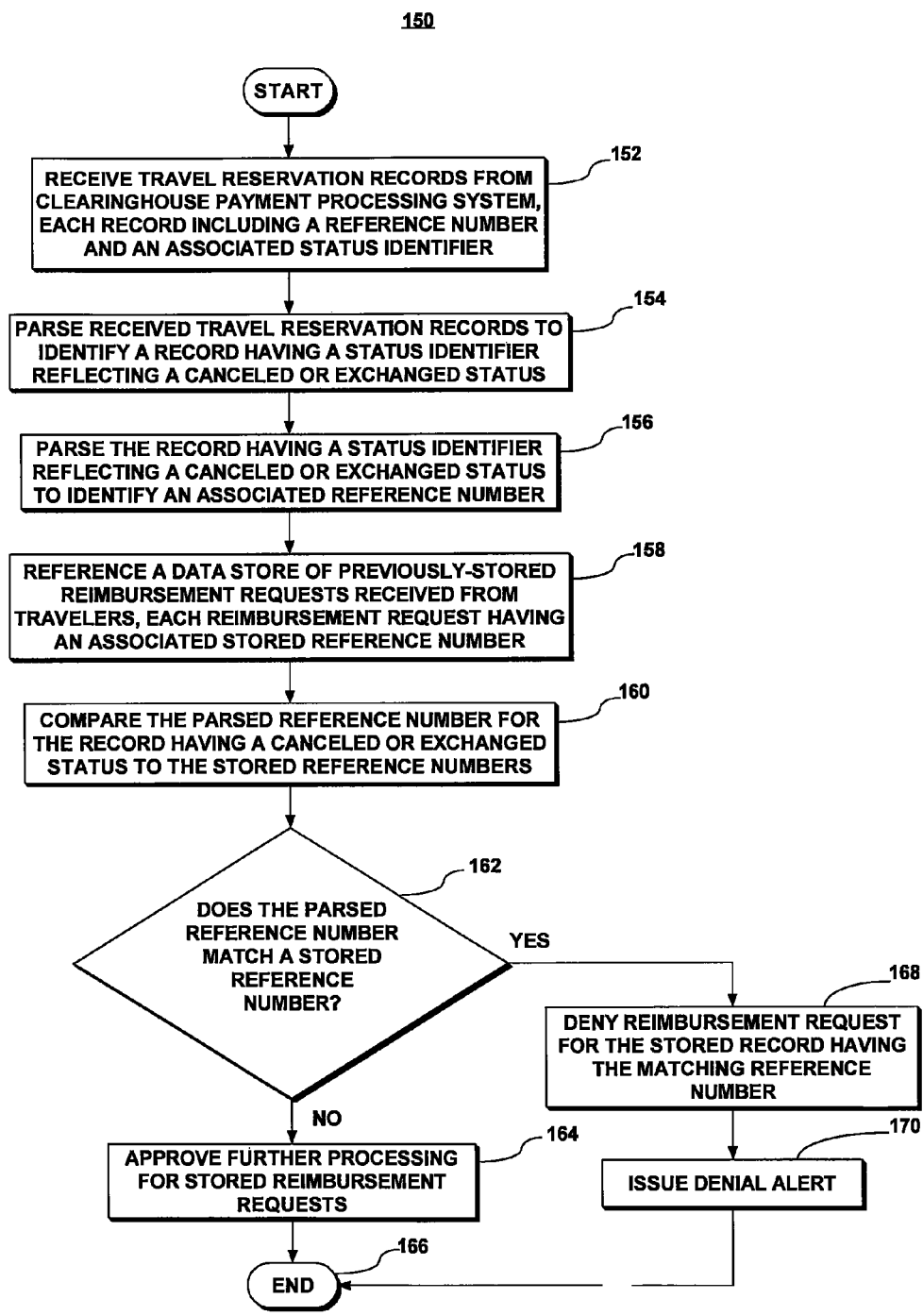
FIG. 3 is a flow diagram illustrating an exemplary method for avoiding reimbursement for canceled and exchanged reservations, in accordance with the present invention.

Referring now to FIG. 3, a flow diagram 150 is shown that illustrates an exemplary method for avoiding reimbursement for canceled airline travel reservations. An employee may obtain a receipt for a ticketed reservation that may appear to be valid, or that is valid when issued. For example, an employee may print a boarding pass via an online booking/reservation/airline service, and seek to submit for reimbursement purposes the printed boarding pass as a "receipt" to show proof of travel. However, the reservation may have been subsequently canceled, and such cancellation would not be reflected on the original receipt. This creates an opportunity for the employee to submit a reimbursement request and be improperly reimbursed for an expense that has already been incurred and refunded.

Somewhat similarly, it should be noted that a traveler can make a non-refundable airline travel reservation, cancel the reservation, and then obtain a new reservation for a relatively low "change" fee by exchanging the canceled reservation for the new reservation. Such a transaction provides the traveler with two receipts in the amount of the face value of each reservation, when in fact the employee has paid considerably less for the required ticket.

To avoid reimbursement for canceled and exchanged airline travel reservations, the EVS 100 is configured to carry out the method illustrated in FIG. 3 to deny reimbursement requests where appropriate, and thus to avoid excessive reimbursement by the company, and a resultant loss. Referring now to FIG. 3, the method begins with the EVS 100 receiving travel reservation records from a clearinghouse payment processing system 90 by data transmission via communications network 40, as shown at 152. See FIG. 1. These information records may be received as part of a datastream transmitted via the network 40 from the clearinghouse payment processing system 90 in a manner similar to the transmission of data to travel agencies, etc. for other purposes, as known in the art. Each information record includes at least a reference number and an associated status identifier. As discussed above, the status identifier indicates the status of the airline travel reservation having the associated reference number, as well-known in the industry. This canceled/exchanged status information is already routinely reflected in each airline travel reservation transaction record distributed and/or maintained by a clearinghouse; no modification of the clearinghouse system is required to track such information. By way of example, the status indicators may indicate a CANCELED status, meaning that the reservation has been canceled and payment has been refunded (in whole or in part), or may indicate an EXCHANGED status, meaning that the reservation has been canceled and that payment has been applied (in whole or in part) toward another airline travel reservation having a different reference number.

The EVS 100 then parses the received travel reservation records to identify at least one record having a status identifier reflecting either a CANCELED status or an EXCHANGED status, as shown at 154. For each such record, the EVS then parses the record to identify an associated reference number, as shown at 156. The EVS 100 then references the data store 118a (FIG. 10) of previously-stored reimbursement requests. Each stored reimbursement request includes at least an associated reference number. The EVS 100 then compares each parsed reference number to the stored reference numbers, as shown at 160, and determines whether each parsed reference number matches a stored reference number, as shown at 162.

If it is determined in 162 that the parsed reference number does not match any stored reference number for any previously-stored reimbursement request, then the EVS 100 conditionally approves further processing of the stored reimbursement requests.

However, if it is determined in 162 that a parsed reference number matches a stored reference number, this indicates that reimbursement is being requested for an airline travel reservation that has been canceled and refunded, or canceled and exchanged/redeemed, and thus that reimbursement would be improper. Accordingly, if such a determination is made, the EVS 100 denies reimbursement of each corresponding reimbursement request having a matching reference number, and the method ends with issuance of a denial alert, as shown at 168, 170 and 166.

Avoiding Reimbursement in Excess of Actual Payment

Figure 4:
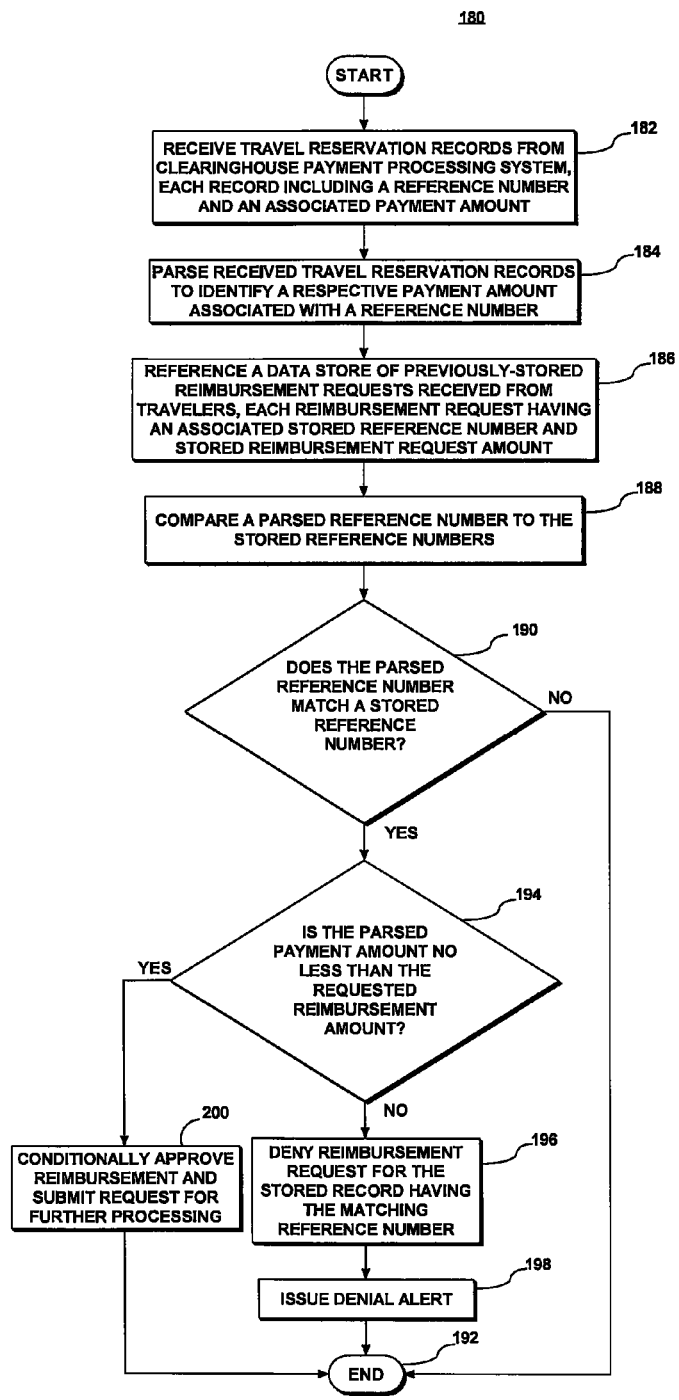
FIG. 4 is a flow diagram illustrating an exemplary method for avoiding reimbursement in excess of actual payment for travel expenses, in accordance with the present invention.

Referring now to FIG. 4, a flow diagram 180 is shown that illustrates an exemplary method for avoiding reimbursement to a traveler in an amount in excess of an actual payment made by the traveler for an airline travel reservation. For example, an employee might obtain a receipt for airline fare (e.g., $350) and may modify the receipt (e.g., using image editing computer software) so that it appears to document a payment in an amount in excess of the actual payment (e.g., $750), and may then request reimbursement in the higher amount.

To avoid reimbursement in excess of the actual payment made, the EVS 100 is configured to carry out the method illustrated in FIG. 4 to deny reimbursement requests where appropriate, and thus to avoid excessive reimbursement by the company, and a resultant loss. Referring now to FIG. 4, the method begins with the EVS 100 receiving travel reservation records from a clearinghouse payment processing system 90 by data transmission via communications network 40, as shown at 182. See FIG. 1. These information records may be received as part of a conventional datastream, as discussed above. Each information record includes at least a reference number and an associated payment amount reflecting the amount paid to make the reservation, e.g., the fare plus applicable fees. This payment amount information is already routinely reflected in each airline travel reservation transaction record distributed and/or maintained by a clearinghouse; no modification of the clearinghouse system is required to track such information.

The EVS 100 then parses the received travel reservation records to identify a payment amount associated with each reference number, as shown at 184. For each such record, the EVS 100 then references the data store 118a (FIG. 10) of previously-stored reimbursement requests, as shown at 186. Each stored reimbursement request includes at least a reference number and a reimbursement request amount. The EVS 100 then compares each parsed reference number to the stored reference numbers, as shown at 188, and determines whether each parsed reference number matches a stored reference number, as shown at 190.

If it is determined at 190 that the parsed reference number does not match any stored reference number for any previously-stored reimbursement request, then this verification process ends, as shown at 192.

However, if it is determined at 190 that a parsed reference number matches a stored reference number, then it is determined whether the parsed payment amount (reflecting the actual amount paid by the traveler) is no less than the requested reimbursement amount, as shown at 194. If the parsed payment amount is greater than or equal to, i.e., no less than, the requested reimbursement amount, then the EVS 100 conditionally approves reimbursement for the associated reimbursement request, subject to other verification methods discussed herein, and submits the request for further processing, as shown at 200.

If it is determined that the parsed amount (reflecting the actual amount paid by the traveler) is less than, i.e., not no less than, the requested reimbursement amount, then the reimbursement requests exceeds the actual amount paid, and the request is improper. In such a case, the EVS 100 denies reimbursement for the corresponding reimbursement request having a matching reference number, and the method ends with issuance of a denial alert, as shown at 196, 198 and 192.

Capturing Refunds to Traveler or Reimbursed Expenses

Figure 5:
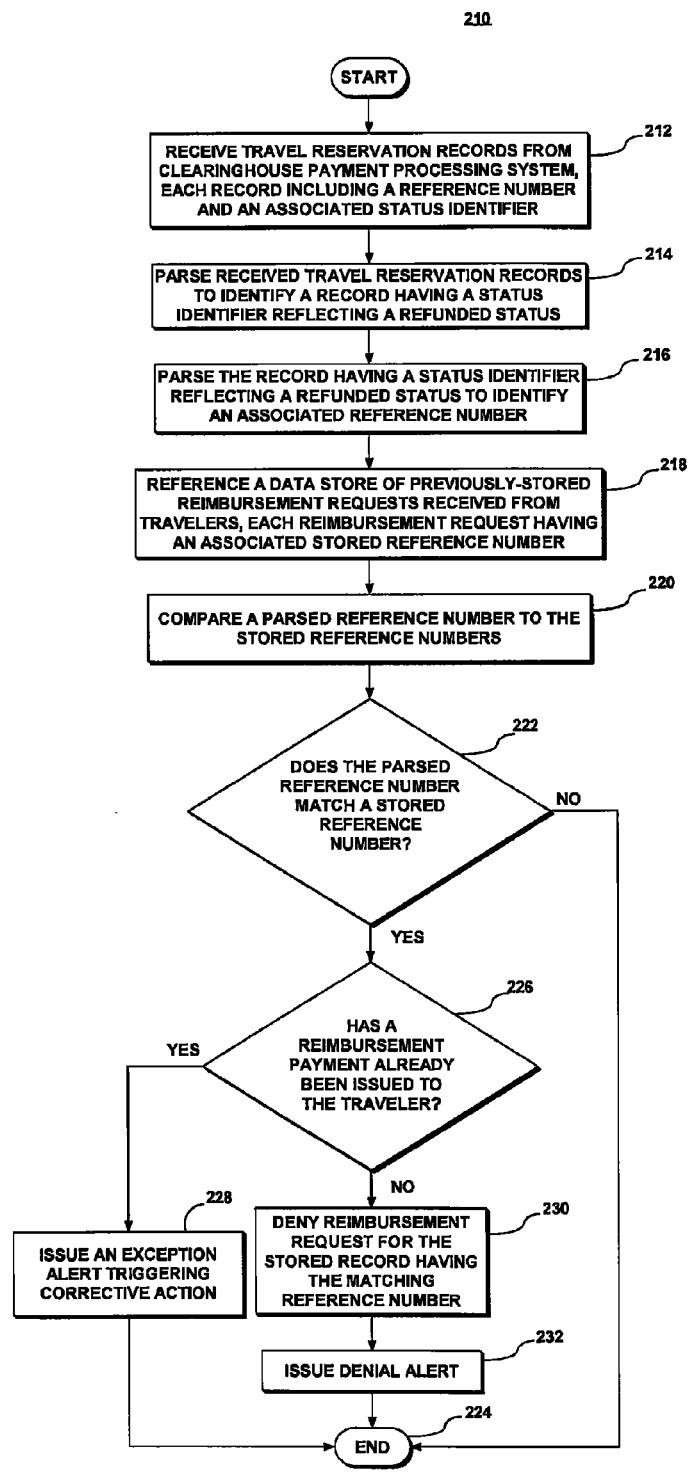
FIG. 5 is a flow diagram illustrating an exemplary method for capturing third party refunds directly to the traveler, in accordance with the present invention.

Referring now to FIG. 5, a flow diagram 210 is shown that illustrates an exemplary method for capturing refunds to a traveler for expenses for which a company has already reimbursed the traveler. For example, an expense for an airline travel reservation may have been submitted for reimbursement by a traveler, and may have been reimbursed by the traveler's employer. However, subsequent canceling of the reservation may result in an airline's refund directly to the employee, e.g., by posting a credit to the employee's credit card that was used by the employee to pay for the travel reservation. Absent additional action, the employer would never be informed of the refund to the employee.

To capture refunds paid to a traveler for an expense already reimbursed by a company, the EVS 100 is configured to carry out the method illustrated in FIG. 5 to deny reimbursement requests where appropriate, and thus to avoid excessive reimbursement by the company, and a resultant loss. Referring now to FIG. 5, the method begins with the EVS 100 receiving travel reservation records from a clearinghouse payment processing system 90 by data transmission via communications network 40, as shown at 212. See FIG. 1. These information records may be received as part of a conventional datastream, as discussed above. Each information record includes at least a reference number and an associated status identifier, as discussed above with reference to FIG. 3. However, in contrast to the method discussed with reference to FIG. 3, this method parses the travel reservation records to identify a record having a status identifier reflecting a REFUNDED status, as shown at 214. The EVS 100 then parses each record having a REFUNDED status to identify an associated reference number, as shown at 216. The EVS 100 then compares each parsed reference number to the reference numbers stored in data store 118*a* and determines whether there is a match, as shown at 220 and 222.

If it is determined at 222 that the parsed reference number does not match any reference number stored in the data store 118*a*, then this verification method ends, as shown at 224.

If, however, it is determined at 222 that the parsed reference number does match a stored reference number, then it is determined whether reimbursement has already been issued to the traveler by the company, as shown at 226. If so, the EVS 100 issues an exception alert triggering corrective action and the method ends, as shown at 228 and 224. The alert may have any suitable form, including a display on a display device of the EVS 100, generation of a suitable printed report identifying the details and denial of the reimbursement request, issuance of any other suitable alert signal and/or transmission or related data. The precise form of the alert is not critical to the method. The exception alert prompts investigation into the matter so that the reimbursement amount may be repaid by the traveler and recaptured by the company.

If it is determined at 226 that reimbursement has not already been made to the traveler, then the EVS 100 denies the reimbursement request having the corresponding reference number and issues a denial alert, as shown at 230, 232, and the method ends, as shown at 224. The denial report may have any suitable form Avoiding Corporate Waste Referring now to FIG. 6, a flow diagram 230 is shown that illustrates an exemplary method for avoiding corporate waste. For example, airline travel reservations may have been made and paid for, but may never have been used, e.g., as in the case of uncollected airline e-tickets. In many instances, such reservations have a monetary value greater than $0, as they may be rescheduled and redeemed at a discount to face value, e.g. upon payment of an additional fee.

Figure 6:
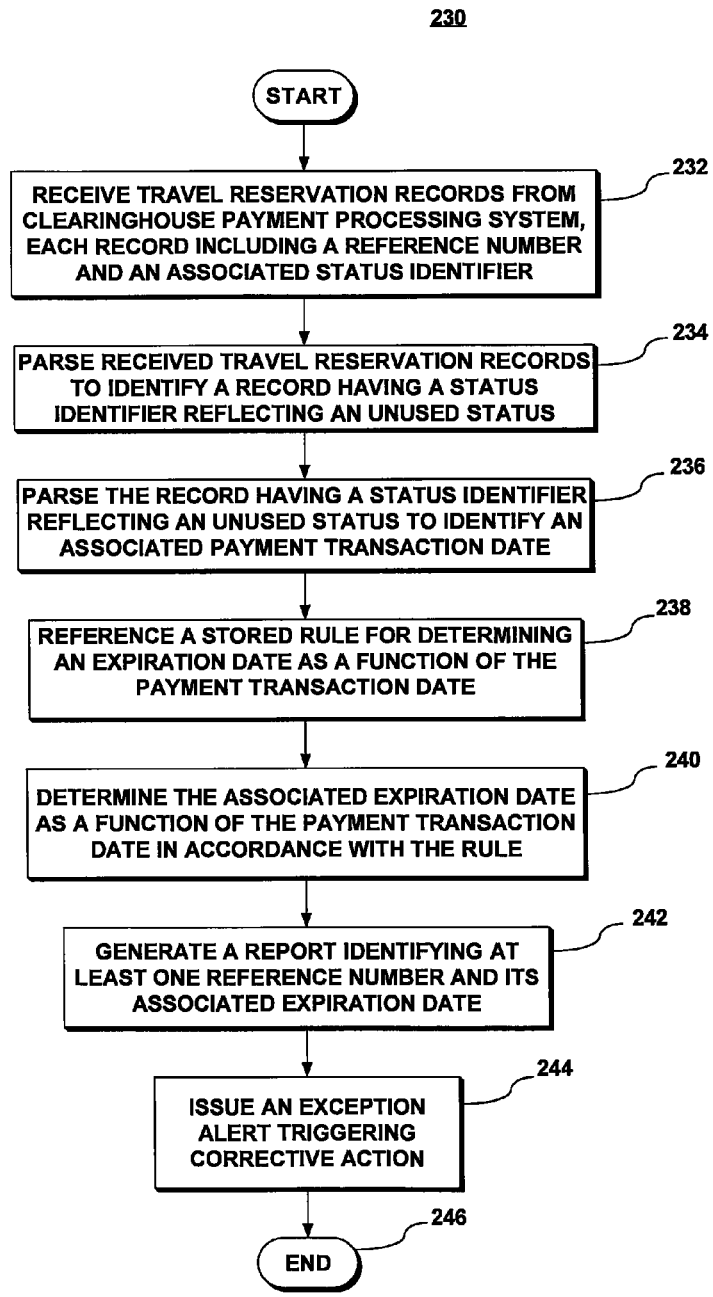
FIG. 6 is a flow diagram illustrating an exemplary method for avoiding corporate waste, in accordance with the present invention.

To avoid corporate waste attributable to allowing such reservations to be lost and never redeemed in any form, the EVS 100 is configured to carry out the method illustrated in FIG. 6 to issue an exception alert triggering corrective action. The exception alert may have any suitable form, as discussed above, and prompts investigation into the matter so that waste of corporate funds, etc. may be avoided.

Referring now to FIG. 6, the method begins with the EVS 100 receiving travel reservation records from a clearinghouse payment processing system 90 by data transmission via communications network 40, as shown at 232. See FIG. 1. Each information record includes at least a reference number and an associated status identifier, as discussed above with reference to FIGS. 3 and 5. However, in contrast to the methods discussed above with reference to FIGS. 3 and 5, this method parses the travel reservation records to identify a record having a status identifier reflecting an UNUSED status, as shown at 234. The EVS 100 then parses each record having a UNUSED status to identify an associated payment transaction date, as shown at 236. The EVS 100 then references a stored rule for determining an expiration date for the airline travel reservation, as shown at 238. The expiration date reflects the date after which the travel reservation is no longer valid, may no longer be used, and/or may no longer have any value for the purposes of exchanging the reservation for a new reservation. The rule may be a single default rule for use within the system, or may be provided by a user to the system. Alternatively, the rule may be one of many rules stored in a rules data store 118*b* stored in the memory 118 of the system, and the system may parse information from the transaction record, such as airline carrier, and use it as a key to reference the rules data store an identify an applicable rule. For example, the system may store a rule indicating that for airline carrier X, all tickets expire 1 year from the date of the original payment transaction. Any suitable rule or any suitable method for determining an expiration date may be used.

The EVS then determines the associated expiration date as a function of the payment transaction date, in accordance with the applicable rule, as shown at 240. For example, this may be accomplished by calculating the one-year anniversary date of the payment transaction date for a rule indicating an expiration date that is one year after the payment transaction date.

The EVS then generates a report identifying at least one reference number and its associated expiration date. The report may have any suitable form, including a display on a display device of the EVS 100, generation of a suitable printed report, or issuance of any other suitable alert signal and/or transmission or related data. The precise form of the report is not critical to the method. An exception alert is then issued to trigger corrective action, as shown at 244, and the method ends, as shown at 246. The exception alert prompts investigation into the matter so that the travel reservation may be canceled, refunded or exchanged prior to the expiration date, to avoid loss to the company of the amount paid for the travel reservation. By way of example, an alert may be issued as a function of the expiration date (e.g., to identify expiration dates occurring in the next 30 days).

Advantageously, by retrieving data from the clearinghouse payment processing system rather than from a single airline, the EVS can create a report and exception alerts listing all uncollected tickets for a single corporation, etc., across multiple airlines, regardless of which agent, airline, or method (e.g., web portal) was used to purchase the reservations.

Avoiding Reimbursement of Non-Reimbursable Expenses

Figure 7:
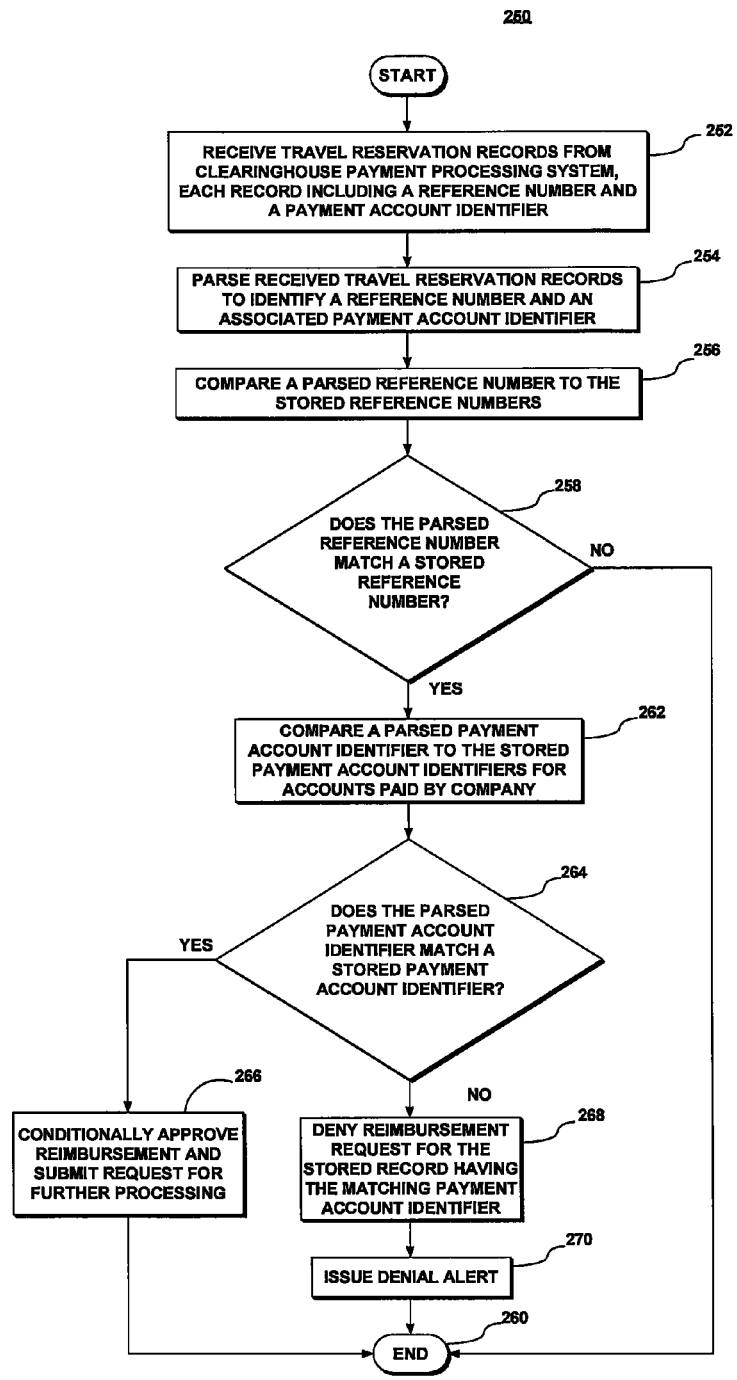
FIG. 7 is a flow diagram illustrating an exemplary method for avoiding reimbursement of non-reimbursable travel expenses, in accordance with the present invention.

Referring now to FIG. 7, a flow diagram 250 is shown that illustrates an exemplary method for avoiding reimbursement of non-reimbursable expenses. For example, airline travel reservations may often be paid for by an employee using a corporate credit card; accordingly, the company/employer, not the employee, has paid for the reservation. Accordingly, the employee/traveler is not entitled to reimbursement of the associated travel expense.

To avoid erroneous reimbursement, because the employee has not paid for the expense for which reimbursement has been requested, the EVS 100 is configured to carry out the method illustrated in FIG. 7 to issue deny reimbursement requests where appropriate, and thus to avoid excessive reimbursement by the company, and a resultant loss. Referring now to FIG. 7, the method begins with the EVS 100 receiving travel reservation records from a clearinghouse payment processing system 90, as shown at 252 and as discussed above. Each information record includes at least a reference number and an associated payment account identifier. For example, a payment account identifier may include a credit card account number for the account used to make payment for the associated airline travel reservation. The EVS 100 then parses the travel reservation records to identify a record having a reference number and an associated payment account identifier, and compares each parsed reference number to the reference numbers stored in data store 118a and determines whether there is a match, as shown at 256 and 258.

If it is determined at 258 that the parsed reference number does not match any reference number stored in the data store 118a, then this verification method ends, as shown at 260.

If, however, it is determined at 258 that the parsed reference number does match a stored reference number, then the parsed payment account identifier associated with each reference number is compared to the stored payment account identifiers, as shown in step 262. For example, payment account identifiers, e.g., credit card and/or bank account numbers, owned and/or funded by the employer/company may be stored in a Company payment account data store 118c stored in the memory 118 of the EVS. Accordingly, a match with one of these numbers would indicate that the company/employer, and not the traveler/employee, paid for the airline travel reservation and thus that the traveler/employee is not entitled to reimbursement.

In an alternative embodiment, payment account identifiers owned and/or funded by the traveler/employee may be stored in a Traveler payment account data store 118d stored in the memory 118 of the EVS. Accordingly, a match with one of these numbers would indicated that the traveler/employee paid for the airline travel reservation, and thus may be entitled to reimbursement.

Referring again to the exemplary embodiment of FIG. 7, the EVS 100 then determines whether parsed payment account identifier matches a stored payment account identifier owned/funded by the company, as shown at 264. If not, then the company has not paid for the reservation, and the EVS 100 conditionally approves reimbursement and submits the request for further verification processing and the method ends, as shown at 264, 266 and 260.

If, however, it is determined at 264 that the parsed payment account identifier matches a stored payment account identifier, then the company, not the traveler/employee, has paid for the reservation and the traveler/employee is not entitled to reimbursement. Accordingly, in this case the EVS 100 denies the request for reimbursement for the record having the matching payment account identifier and issues a denial alert before ending, as shown at 264, 268, 270 and 260.

Ensuring Compliance with Corporate Policies

Various corporate policies may be enforced by the EVS, in a similar manner. For example, company policy may permit reimbursement of COACH airline fares, but may reject PREMIUM COACH fares. Accordingly, the EVS may store company-specific policy information and/or rules, and may compare clearinghouse transaction data to such information and/or rules, and reject request for reimbursement for which the clearinghouse transaction data is inconsistent with the pre-stored information/rules. For example, if an employer receives a request for reimbursement of ticket #1234567890, and the EVS stores a rule indicating that COACH fares are reimbursable, but PREMIUM COACH fares are not, the EVS will reference transaction data received from the clearinghouse, and approve the request if the fare basis parsed from the transaction data is COACH, and reject the request if the fare basis parsed from the transaction data is PREMIUM COACH.

Figure 8:
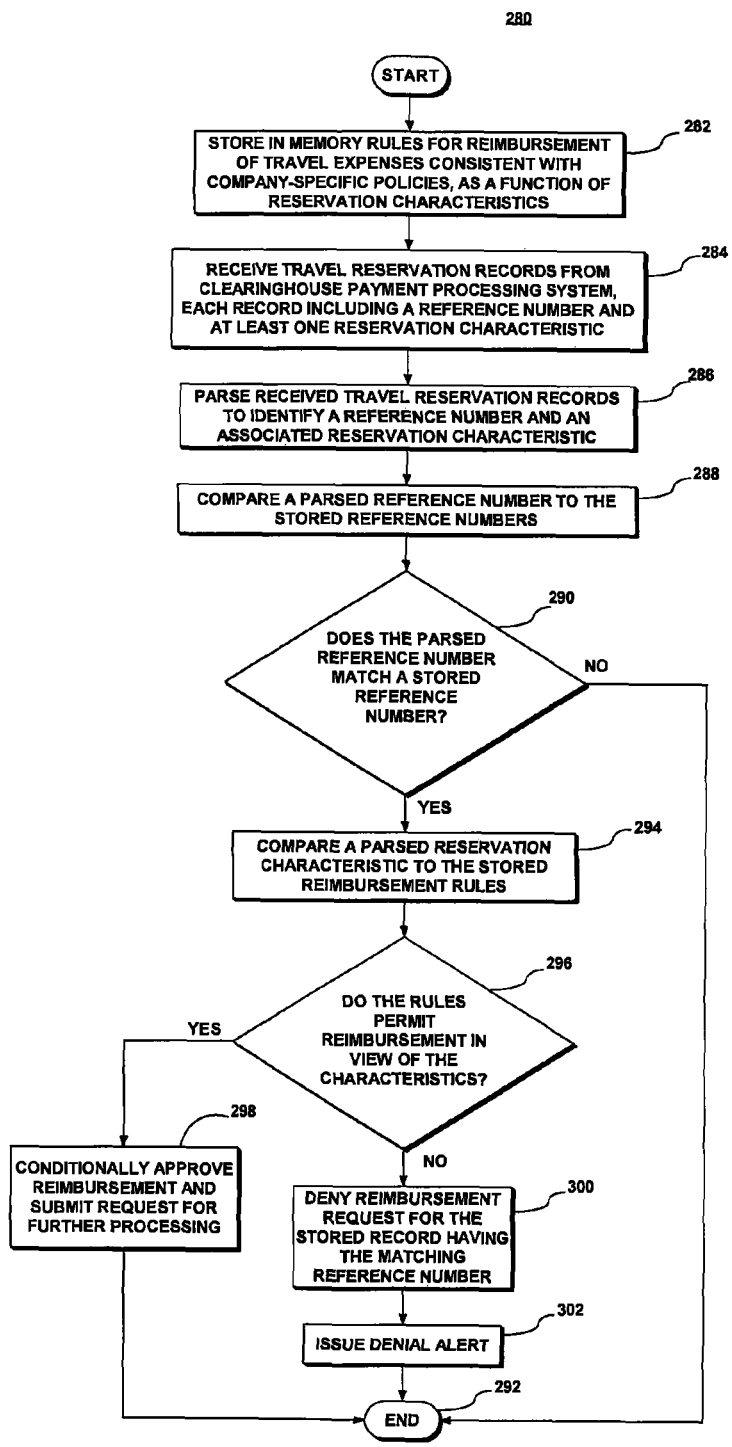
FIG. 8 is a flow diagram illustrating an exemplary method for ensuring compliance with corporate policies, in accordance with the present invention.

Referring now to FIG. 8, a flow diagram 280 is shown that illustrates an exemplary method for ensuring compliance with corporate policies.

To avoid reimbursement in the event of non-compliance with a company policy, the EVS 100 is configured to carry out the method illustrated in FIG. 8 to deny reimbursement requests where appropriate, and thus to avoid excessive reimbursement by the company, and a resultant loss. Referring now to FIG. 8, the method begins with storing in a Policy data store 118e in the memory 118 of the EVS 100 rules for reimbursement of travel expenses consistent with company-specific policies, as shown at 282. Importantly, these rules are configured to conditionally permit reimbursement as a function of reservation characteristics that are or may be captured in the data received from the clearinghouse payment processing system's datastream. For example, the fare basis (COACH, PREMIUM COACH, etc.) may be reflected in such data, and the rules may permit 100% reimbursement for a reservation having a COACH reservation characteristic, but may permit 0% reimbursement, or partial reimbursement, for a reservation having a PREMIUM COACH reservation characteristic.

The EVS 100 then receives travel reservation records from a clearinghouse payment processing system 90, as shown at 284 and as discussed above. Each information record includes at least a reference number and an associated reservation characteristic. The EVS 100 then parses the travel reservation records to identify a record having a reference number and an associated reservation characteristic, and compares each parsed reference number to the reference numbers stored in data store 118a and determines whether there is a match, as shown at 286, 288 and 290.

If it is determined at 290 that the parsed reference number does not match any reference number stored in the data store 118a, then this verification method ends, as shown at 292.

If, however, it is determined at 290 that the parsed reference number does match a stored reference number, then the parsed reservation characteristic associated with each reference number is compared to the stored reimbursement rules from the policy data store 118e, as shown at 294. It is then determined whether the rules permit reimbursement in view of the associated reservation characteristic(s), as shown at 296. If so, the EVS 100 conditionally approves reimbursement and passes the request for further processing, as shown at 296, 298 and 292. If not, then the EVS 100 denies the request for reimbursement for the record having the matching reference number and issues a denial alert before ending, as shown at 296, 298, 300 and 302.

Detecting Non-Business Use of Company-Purchased Tickets

Figure 9:
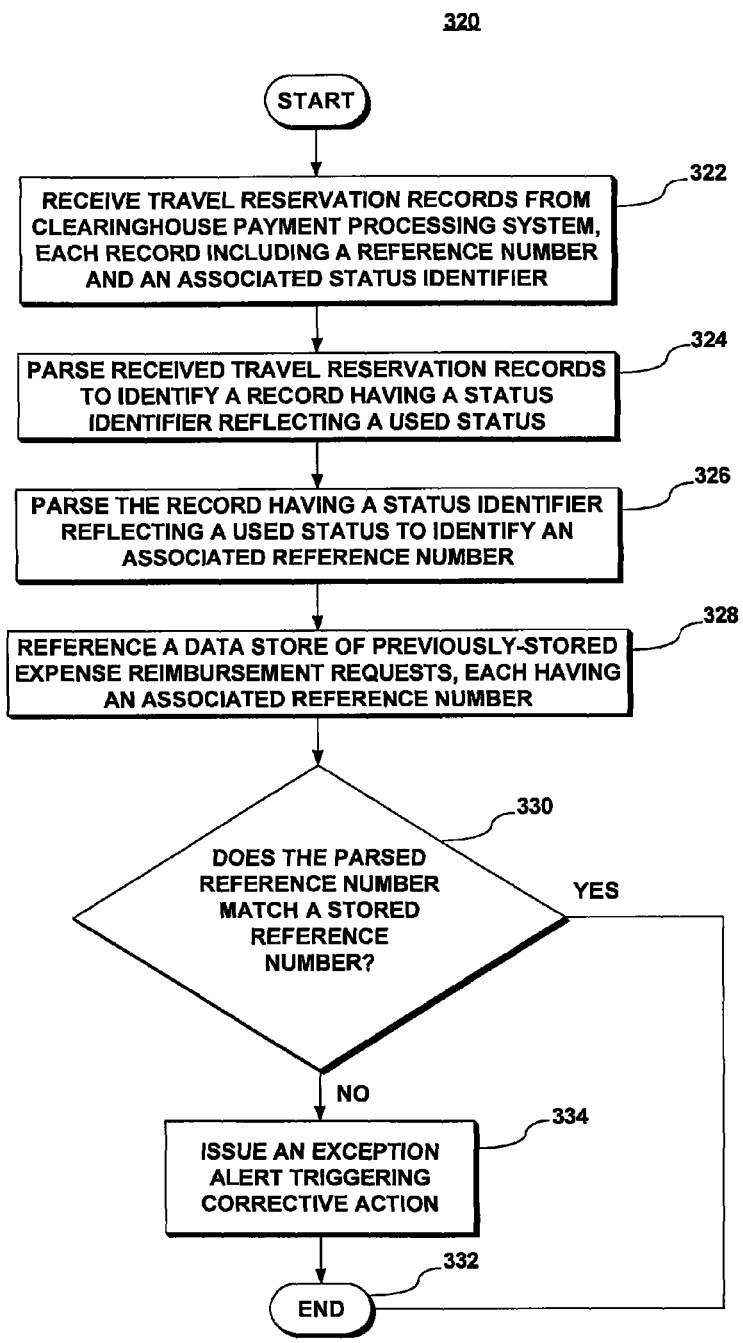
FIG. 9 is a flow diagram illustrating an exemplary method for detecting non-business use of company-purchased tickets, in accordance with the present invention.

Referring now to FIG. 9, a flow diagram 320 is shown that illustrates an exemplary method for detecting non-business use of a company-purchased reservation intended for business travel. Reservations may have been made and used, but may never have been submitted as part of a company expense report, because they were never used for business travel, although they were paid for by the company.

To detect non-business use of an airline travel reservation for which the company has paid, the EVS is configured to carry out the method illustrated in FIG. 9 to issue an exception alert triggering corrective action. Referring now to FIG. 9, the method begins with the EVS 100 receiving travel reservation records from a clearinghouse payment processing system 90, and parsing the received records to identify reference numbers having a USED status, as shown at 322, 324 and 326. The EVS 100 then references a data store 118a of previously-stored reimbursement requests and compares parsed reference numbers to stored reference numbers, as shown at 328 and 330. If there is a match, this method ends, as shown at 332, and further expense verification processing may continue. However, if there is no match, then a matching expense report has not been submitted. This may be indicative of non-business use of a company-purchase ticket. Accordingly, in this instance the EVS 100 issues an exception report so that the matter can be investigated, as shown at step 334.

Accordingly, the EVS can be used to automatedly audit and/or approve requests for reimbursement for expenses submitted via corporate expense reports, and/or as a decision support tool for advising human personnel considering whether to approve requests for reimbursement. More specifically, the EVS is configured to continually receive updated transaction data from ACH and ICH clearinghouse systems, and to compare transaction data from the clearinghouse systems to corresponding reimbursement requests, based on matching ticket or other reference numbers, and to reject reimbursement requests for which the requested reimbursement is inconsistent with the data received from the clearinghouse. In a preferred embodiment, the EVS, and the clearinghouse, GDS or other system is configured to exchange updated information on a regular, e.g. nightly, basis.

Further, the EVS is configured to detect non-compliance with corporate policies or other irregularities by checking data received from the clearinghouses against corporate policies and/or expense report data maintained in an expense report software database, spreadsheet, etc.

In a preferred embodiment, the EVS receives a stream of data from a clearinghouse of transaction data for travel/expense vendors, the stream of data identifying reference numbers and associated status identifiers for transactions made and/or paid for by the enterprise, references a data store of employee-submitted expense report data, the data store identifying reference numbers and payment amounts for expenses, compares information records from the clearinghouse data stream to information records from the data store for each reference number, and takes predefined action in accordance with predefined rules as a result of the comparison. Such predefined action may include one or more of: approving reimbursement of an expense, denying reimbursement of an expense, approving reimbursement in an amount other than a requested amount, and creating an exception report prompting investigation of a matter.

FIG. 10 is a block diagram of a expense verification system (EVS) (shown logically as a single representative server for ease of illustration) 100 (see FIG. 1) in accordance with the present invention. The EVS 100 includes conventional computer hardware storing and/or executing specially-configured computer software that configures the hardware as a particular special-purpose machine having various specially-configured functional sub-components that collectively carry out methods in accordance with the present invention. Accordingly, the expense verification system 100 of FIG. 10 includes a general purpose processor and a bus 104 employed to connect and enable communication between the processor 102 and the components of the expense verification system 100 in accordance with known techniques. The EVS 100 typically includes a user interface adapter 106, which connects the processor 102 via the bus 104 to one or more interface devices, such as a keyboard 108, mouse 110, and/or other interface devices 112, which can be any user interface device, such as a touch sensitive screen, digitized entry pad, etc. The bus 104 also connects a display device 114, such as an LCD screen or monitor, to the processor 102 via a display adapter 116. The bus 104 also connects the processor 102 to memory 118, which can include a hard drive, diskette drive, tape drive, etc.

The EVS 100 may communicate with other computers or networks of computers, for example via a communications channel, network card or modem 119. The EVS 100 may be associated with such other computers in a local area network (LAN) or a wide area network (WAN), and operates as a server in a client/server arrangement with another computer, etc. Such configurations, as well as the appropriate communications hardware and software, are known in the art.

The EVS' software is specially configured in accordance with the present invention. Accordingly, as shown in FIG. 10, the EVS 100 includes computer-readable, processor-executable instructions stored in the memory for carrying out the methods described herein. Further, the memory stores certain data, e.g. in databases or other data stores shown logically in FIG. 10 for illustrative purposes, without regard to any particular embodiment in one or more hardware or software components. For example, FIG. 10 shows schematically storage in the memory 118 of the EVS 100 expense reimbursement request data in Expense Report Data Store 118a, reservation expiration date determination rules in Expiration Date Rules Data Store 118b, company payment account identifier data in Company Payment Account Identifier Data Store 118c, traveler payment account identifier data in Traveler Payment Account Identified Data Store 118d, and rules for reimbursement in accordance with company policies in Policy Data Store 118e.

Additionally, computer readable media storing computer readable code for carrying out the method steps identified above is provided. The computer readable media is a physical storage device stores code for carrying out subprocesses for carrying out the methods described above.

A computer program product recorded on a computer readable medium for carrying out the method steps identified above is provided. The computer program product comprises computer readable means for carrying out the methods described above.

It will be appreciated that although the simplified methods shown herein for illustrative purposes discuss receipt of a single reimbursement request, in a typical commercial embodiment, the methods will be repeated or adapted for numerous reimbursement requests. Optionally, the reimbursement request data for denied requests may be deleted or not stored in a data store, or may be stored in the data store as a rejected request so that it is not considered to be equivalent to a valid reimbursement request.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

parse the travel reservation record to identify a status identifier reflecting a canceled status of the travel reservation, the canceled status reflecting that the travel reservation has been canceled;

parse the travel reservation record having a canceled status to identify a parsed reference number;

compare the parsed referenced number to the stored plurality of reimbursement requests to determine whether the parsed reference number matches a stored reference number; and selectively deny at least one stored reimbursement request as a function of data contained in the travel reservation record received from the payment clearinghouse system, said selectively denying comprising issuing a denial alert if at least one reimbursement request is denied;

wherein the computerized expense verification system operating the processor under control of processor-executable instructions stored in the memory to selectively deny at least one stored reimbursement request as a function of data contained in the travel reservation record comprises denying each stored reimbursement request having a stored reference number matching a parsed reference number for a travel reservation record having a status identifier reflecting a canceled status.

2. The method of claim 1, wherein the reference number comprises an airline ticket number.

3. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

parse the travel reservation record to identify a status identifier reflecting an exchanged status of the travel reservation, the exchanged status reflecting that the travel reservation has been exchanged for another travel reservation;

parse the travel reservation record having a canceled status to identify a parsed reference number;

compare the parsed referenced number to the stored plurality of reimbursement requests to determine whether the parsed reference number matches a stored reference number; and selectively deny at least one stored reimbursement request as a function of data contained in the travel reservation record received from the payment clearinghouse system, said selectively denying comprising issuing a denial alert if at least one reimbursement request is denied;

wherein the computerized expense verification system operating the processor under control of processor-executable instructions stored in the memory to selectively deny at least one stored reimbursement request as a function of data contained in the travel reservation record comprises denying each stored reimbursement request having a stored reference number matching a parsed reference number for a travel reservation record having a status identifier reflecting an exchanged status.

4. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

parse the travel reservation record to identify a status identifier reflecting a refunded status of the travel reservation, the refunded status reflecting that a payment for the travel reservation has been refunded;

parse the travel reservation record having an refunded status to identify a parsed reference number;

compare the parsed referenced number to the stored plurality of reimbursement requests to determine whether the parsed reference number matches a stored reference number; and selectively deny at least one stored reimbursement request as a function of data contained in the travel reservation record received from the payment clearinghouse system, said selectively denying comprising issuing a denial alert if at least one reimbursement request is denied;

wherein the computerized expense verification system operating the processor under control of processor-executable instructions stored in the memory to selectively deny at least one stored reimbursement request as a function of data contained in the travel reservation record comprises denying each stored reimbursement request having a stored reference number matching a parsed reference number for a travel reservation record having a status identifier reflecting a refunded status if a reimbursement payment has not already been issued to the traveler for the reimbursement request associated with the matching reference number.

5. The method of claim 4, the method further comprising the computerized expense verification system operating the processor under control of processor-executable instructions stored in the memory to:

issue an exception alert triggering correction action if the parsed reference number matches a stored reference number and a reimbursement payment has already been issued to the traveler for the reimbursement request associated with the matching reference number.

6. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

store in the memory a plurality of payment account identifiers for accounts owned by a company;

parse the travel reservation record to identify an associated payment account identifier identifying a payment account used to pay for the travel reservation;

parse the travel reservation record to identify a parsed reference number associated with the payment account identifier;

compare the parsed referenced number to the stored plurality of reimbursement requests to determine whether the parsed reference number matches a stored reference number; and selectively deny at least one stored reimbursement request as a function of data contained in the travel reservation record received from the payment clearinghouse system, said selectively denying comprising issuing a denial alert if at least one reimbursement request is denied;

wherein the computerized expense verification system operating the processor under control of processor-executable instructions stored in the memory to selectively deny at least one stored reimbursement request as a function of data contained in the travel reservation record comprises denying each stored reimbursement request having a stored reference number matching a parsed reference number if the parsed payment account identifier matches a stored payment account identifier.

7. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

store in the memory a plurality of payment account identifiers for accounts owned by a traveler;

parse the travel reservation record to identify an associated payment account identifier identifying a payment account used to pay for the travel reservation;

parse the travel reservation record to identify a parsed reference number associated with the payment account identifier;

compare the parsed referenced number to the stored plurality of reimbursement requests to determine whether the parsed reference number matches a stored reference number; and selectively deny at least one stored reimbursement request as a function of data contained in the travel reservation record received from the payment clearinghouse system, said selectively denying comprising issuing issue a denial alert if at least one reimbursement request is denied;

wherein the computerized expense verification system operating the processor under control of processor-executable instructions stored in the memory to selectively deny at least one stored reimbursement request as a function of data contained in the travel reservation record comprises denying each stored reimbursement request having a stored reference number matching a parsed reference number if the parsed payment account identifier does not match a stored payment account identifier.

8. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

parse the travel reservation record to identify a status identifier reflecting a used status of the travel reservation, the used status reflecting that the travel reservation has been used;

parse the travel reservation record having a used status to identify a parsed reference number;

compare the parsed referenced number to the stored plurality of reimbursement requests to determine whether the parsed reference number matches a stored reference number;

issue an alert as a function of data contained in the travel reservation record received from the payment clearinghouse system; and issue an exception alert triggering corrective action if the parsed reference number does not match a stored reference number.

9. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record transmitted from a payment clearinghouse system, the record comprising a reference number and associated reservation data;

store in the memory a rule for determining an expiration date of a travel reservation as a function of a payment transaction date for the travel reservation;

parse the travel reservation record to identify a status identifier reflecting an unused status of the travel reservation;

parse the travel reservation record having an unused status to identify an associated payment transaction date;

determine an associated expiration date for the travel reservation as a function of the parsed payment transaction date in accordance with the stored rule;

selectively deny at least one stored reimbursement request as a function of data contained in the travel reservation record received from the payment clearinghouse system; and issue an exception alert triggering corrective action if the parsed reference number matches a stored reference number.

10. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of reimbursement requests for travel reservations, each reimbursement request comprising a respective reference number;

receive, via a communications network, a travel reservation record, the record comprising a reference number and associated reservation data;

parse the travel reservation record to identify a status identifier reflecting a status of the travel reservation; and selectively deny at least one stored reimbursement request as a function of the status identifier contained in the travel reservation record.

11. The method of claim 10, wherein the travel reservation record is transmitted via a communications network, and received at the computerized expense verification system from a global distribution system (GDS).

12. The method of claim 10, wherein the travel reservation record is transmitted via a communications network, and received at the computerized expense verification system from a payment clearinghouse system.

13. The method of claim 10, wherein the travel reservation record is transmitted via a communications network, and received at the computerized expense verification system from a travel agent system.

14. The method of claim 10, wherein the travel reservation record is transmitted via a communications network, and received at the computerized expense verification system from a clearinghouse system.

* * * * *